(12) United States Patent
Shaw (10) Patent No.: US 10,820,605 B2
(45) Date of Patent: Nov. 3, 2020

(54) ICED TEA PRESS AND METHOD OF USING SAME

(71) Applicant: DAVIDsTEA INC., Town of Mount Royal (CA)

(72) Inventor: David Shaw, Montreal (CA)

(73) Assignee: DAVIDSTEA INC., Québec (CA)

( * ) Notice: Subject to any disclaimer, the term of this patent is extended or adjusted under 35 U.S.C. 154(b) by 344 days.

(21) Appl. No.: 15/458,507

(22) Filed: Mar. 14, 2017

(65) Prior Publication Data

US 2018/0263253 A1    Sep. 20, 2018

(51) Int. Cl.
*A47J 31/20* (2006.01)
*A23F 3/18* (2006.01)
*A47J 31/00* (2006.01)

(52) U.S. Cl.
CPC .............. *A23F 3/18* (2013.01); *A47J 31/005* (2013.01); *A47J 31/20* (2013.01)

(58) Field of Classification Search
CPC ...... A47J 31/005; A47J 31/20; A47J 31/0615; A47J 31/18; A23F 3/18; A47G 19/2272
See application file for complete search history.

(56) References Cited

U.S. PATENT DOCUMENTS 9,648,976 B2 * 5/2017 Scott ..................... A47J 31/005
2016/0262564 A1 * 9/2016 Scott ...................... A47J 31/02

* cited by examiner

*Primary Examiner* — Hong T Yoo
(74) *Attorney, Agent, or Firm* — Hauptman Ham, LLP (57) ABSTRACT

An iced tea press is disclosed. The iced tea press comprises an elongated hollow container and an elongated hollow member sized and shaped to be slidably inserted into the elongated hollow container. The elongated hollow member has a bottom end comprising a plurality of cavities sized and shaped for retaining particles of a given size and an openable top end. A method for preparing iced tea is also disclosed.

11 Claims, 9 Drawing Sheets

ICED TEA PRESS AND METHOD OF USING SAME

FIELD OF THE INVENTION

The invention relates to tea. More precisely, the invention pertains to an iced tea press and a method of using same.

BACKGROUND OF THE INVENTION

Being able to prepare iced tea is of great interest.

In fact, preparing iced tea usually comprises two steps.

A first step is to prepare the tea, while a second step is to reduce the temperature of the beverage to thereby create iced tea.

Reducing the temperature of the beverage can be done, for instance, by inserting the tea prepared into a freezer or a fridge. This may take some time, which is a drawback when the user is in a rush.

Another issue is the fact that the user has to stay close to the fridge or to the freezer until the mixture prepared is cold enough.

An alternative embodiment for preparing the drink is to insert a coolant such as ice cubes into a tea pot or a container containing the hot tea in order to cool it down. While this may be less cumbersome for the user, this solution still suffers from a couple of drawbacks.

A first drawback is the fact that the user has to anticipate how much coolant has to be poured or inserted. If this is not done carefully, the mixture may overflow the container, which is not desirable.

A second drawback is that the user may still have to filter the mixture in the case where loose leaves or tea mixture are inserted into the tea pot or container once the coolant is inserted.

A third drawback is that the user may further need an additional utensil such as spoon to make sure that the resulting mixture is uniform in terms of temperature.

There is a need for a device that will overcome at least one of the above-identified drawbacks.

Features of the invention will be apparent from review of the disclosure, drawings and description of the invention below.

BRIEF SUMMARY OF THE INVENTION

According to a broad aspect, there is disclosed an iced tea press comprising an elongated hollow container; an elongated hollow member sized and shaped to be slidably inserted into the elongated hollow container; the elongated hollow member having a bottom end comprising a plurality of cavities sized and shaped for retaining particles of a given size and an openable top end.

According to an embodiment, the openable top end comprises an openable member manually secured at the top end of the elongated hollow member; further wherein the openable member comprises an aperture and a corresponding closing member for selectively opening or closing the aperture.

According to an embodiment, the openable member is threadingly engaged at the top end of the elongated hollow member.

According to an embodiment, the openable member comprises a hole aligned with a center of the openable member and the aperture; further wherein the corresponding closing member comprises a first prong extending perpendicularly from the closing member and sized and shaped to tightly snuggle the hole to thereby secure the corresponding closing member to the openable member.

According to an embodiment, the corresponding closing member comprises a first elongated element comprising the first prong and a tab for covering the aperture; a covering element secured to the first elongated element; the covering element comprising a tab extending outwardly.

According to an embodiment, the elongated hollow member comprises at least one sealing element for enabling the elongated hollow member to tightly fit into the elongated hollow container.

According to an embodiment, the elongated hollow member comprises a bottom groove extending horizontally at a bottom of the elongated hollow member; and the at least one sealing element comprises a corresponding bottom sealing element secured in the bottom groove and comprising at least one lid extending outwardly.

According to an embodiment, the elongated hollow member comprises an upper groove extending horizontally near a bottom of the elongated hollow member and the at least one sealing element comprises a corresponding upper sealing element secured in the upper groove and comprising at least one lid extending outwardly.

According to an embodiment, the elongated hollow container and the elongated hollow member have a cylindrical shape.

According to an embodiment, the elongated hollow container and the elongated hollow member are made of Eastman Tritan™ acrylic.

According to an embodiment, the corresponding bottom sealing element and the corresponding upper sealing element are made of silicone.

According to an embodiment, the covering element is made of a flexible rubber such as silicone or Thermoplastic Elastomer (TPE).

According to an embodiment, each of the plurality of cavities has a diameter size measured in microns.

According to a broad aspect, there is disclosed a method for preparing iced tea, the method comprising providing an iced tea press comprising an elongated hollow container; an elongated hollow member sized and shaped to be slidably inserted into the elongated hollow container; the elongated hollow member having a bottom end comprising a plurality of cavities sized and shaped for retaining particles of a given size and an openable top end; removing the elongated hollow member from the elongated hollow container; inserting a tea mixture and hot water into the elongated hollow container; inserting a cooling element into the elongated hollow member; inserting the elongated hollow member inside the elongated hollow container; and closing the openable top end.

According to an embodiment, the method further comprises shaking the iced tea press.

According to an embodiment, the cooling element comprises ice cubes.

According to an embodiment, there is disclosed a use of the iced tea press as disclosed above for preparing iced tea.

An advantage of the iced tea press disclosed herein is that it is transportable by a user.

Another advantage of the iced tea press disclosed herein is that a user may consume the iced tea readily from it thanks to the plurality of cavities sized and shaped for retaining tea particles.

Another advantage of the iced tea press disclosed herein is that it enables a user to insert a cooling element without having the liquid spilling outside the container, which is of great advantage.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

The term "tea" and like terms mean tea leaves, tea mixture, herbal and fruit infusions or mixtures thereof.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to an iced tea press and a method of using same.

Now referring to FIGS. 1-7, there is shown an embodiment of an iced tea press 10.

As explained further below, the iced tea press 10 is used for enabling a user to make and consume iced tea.

As shown in those figures, the iced tea press 10 has an elongated cylindrical shape.

The skilled addressee will appreciate that various alternative embodiments may be provided for the shape of the iced tea press 10. For instance, the iced tea press 10 may have the shape of an elongated polygon, such as a square for instance, instead of an elongated cylindrical. It will be appreciated by the skilled addressee that the size and capacity may vary up to that of a pitcher.

Figure 9:
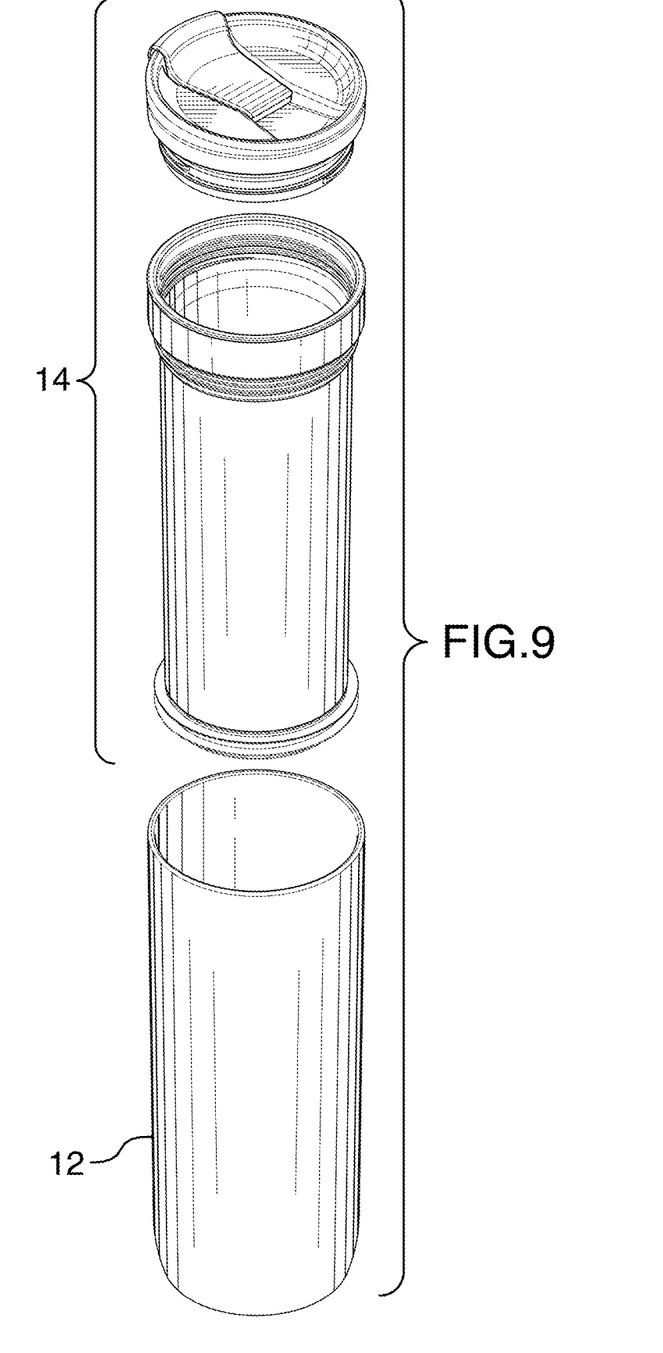
FIG. 9 is a top, left, 3D perspective and exploded view of an embodiment of an iced tea press.

Now referring to FIG. 9, there is shown an exploded view of an embodiment of the iced tea press 10.

The iced tea press 10 comprises an elongated hollow container 12.

In this embodiment, the elongated hollow container 12 has a cylindrical shape as explained above.

It will be appreciated that the elongated hollow container 12 may be made of various materials.

In one embodiment, the elongated hollow container 12 is made of Eastman™ acrylic. In an alternative embodiment, the elongated hollow container 12 is made of a material selected from a group consisting of glass, stainless steel and rigid plastics.

The iced tea press 10 further comprises an elongated hollow member 14.

It will be appreciated that the elongated hollow member 14 may be made of various materials.

In one embodiment, the elongated hollow member 14 is made of Eastman™ acrylic. In an alternative embodiment, the elongated hollow member 14 is made of a material selected from a group consisting of glass, stainless steel and rigid plastics.

It will be appreciated that the elongated hollow member 14 is sized and shaped to be slidably inserted in the elongated hollow container 12.

In one embodiment, the elongated hollow member 14 may be fully inserted into the elongated hollow container 12.

In the embodiment shown in FIGS. 8-12, the elongated hollow member 14 may be also slidably, yet not fully, inserted into the elongated hollow container 12.

As further explained below, it will be appreciated that the elongated hollow member 14 may be inserted by the user into a desired position located inside the elongated hollow container 12.

More precisely, the elongated hollow member 14 has a bottom end and a top end.

The bottom end comprises a plurality of cavities 16 sized and shaped for retaining particles of a given size.

It will be appreciated that the plurality of cavities 16 may have various sizes depending on the type of particles to retain. In fact, it will be appreciated that the purpose of the cavities is to keep the tea particles away from the inside 8 of the elongated hollow member 14, as will further be explained below. The size of the plurality of particles will obviously depend on the tea used. In one embodiment, tea leaves of a substantial size may be used, while in another embodiment, a tea mixture made of smaller particles may be used in the iced tea press 10.

In one embodiment, the size is 0.1 mm.

It will be appreciated that, in one embodiment, the plurality of cavities are provided by a fine nylon or a steel mesh covering larger cavities. In such embodiment, the fine nylon or the steel mesh is provided with cavities having a diameter size measured in microns.

It will be appreciated that the elongated hollow member 14 comprises an openable top end.

The openable top end comprises an openable member 18 secured at the top of the elongated hollow member 14. The openable member 18 further comprises an aperture 20 and a corresponding closing member 22 for selectively opening or closing the aperture 20.

Figure 1:
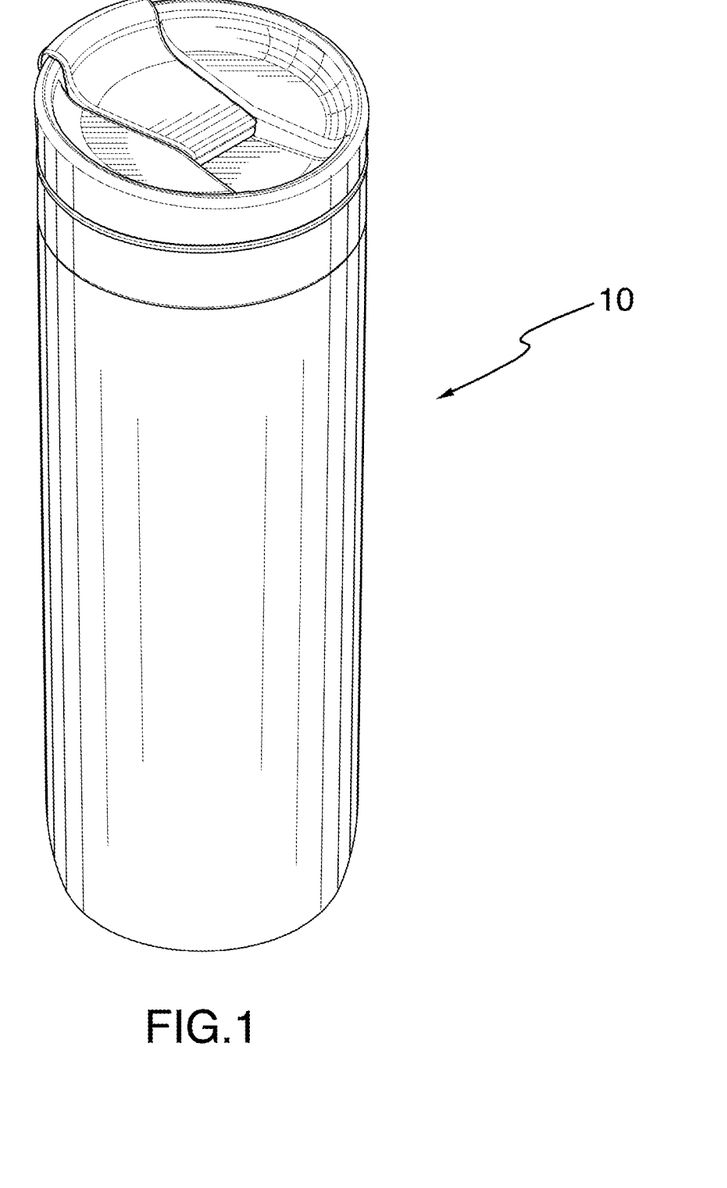
FIG. 1 is a top, left, 3D perspective view of an embodiment of an iced tea press.
Figure 2:
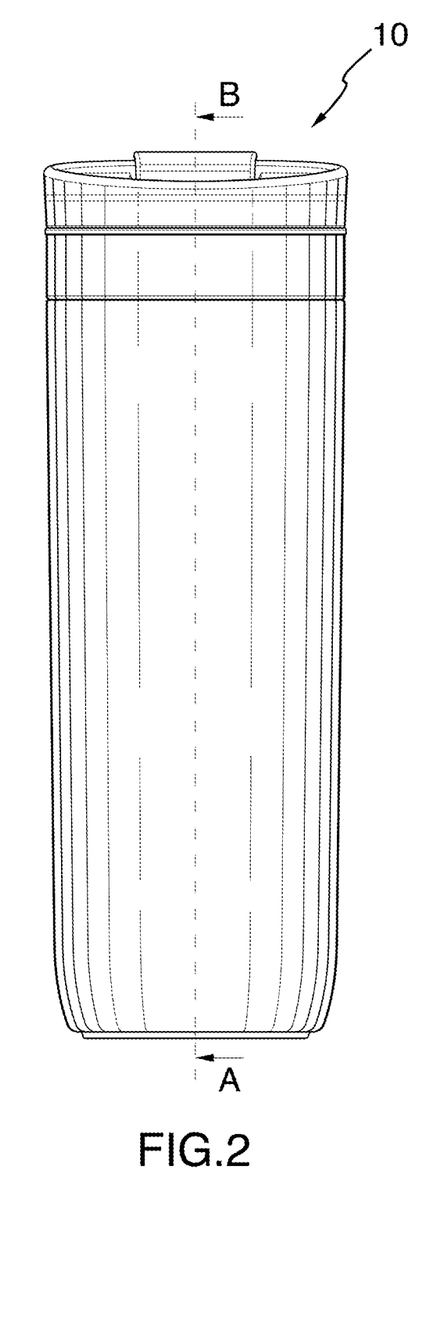
FIG. 2 is a front elevation view of an embodiment of an iced tea press.
Figure 3:
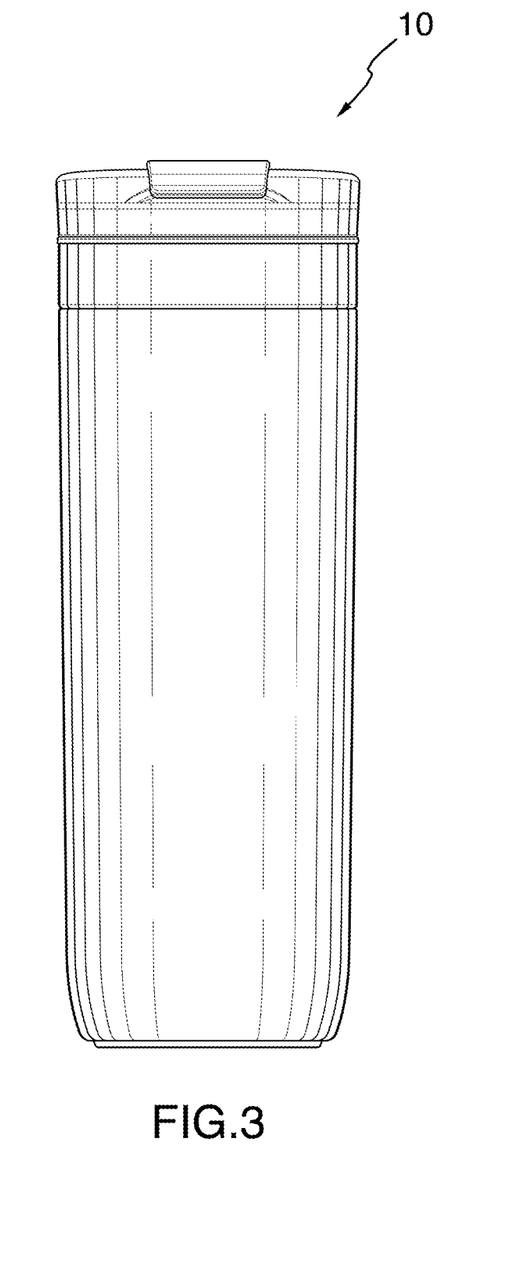
FIG. 3 is a rear elevation view of an embodiment of an iced tea press.
Figure 4:
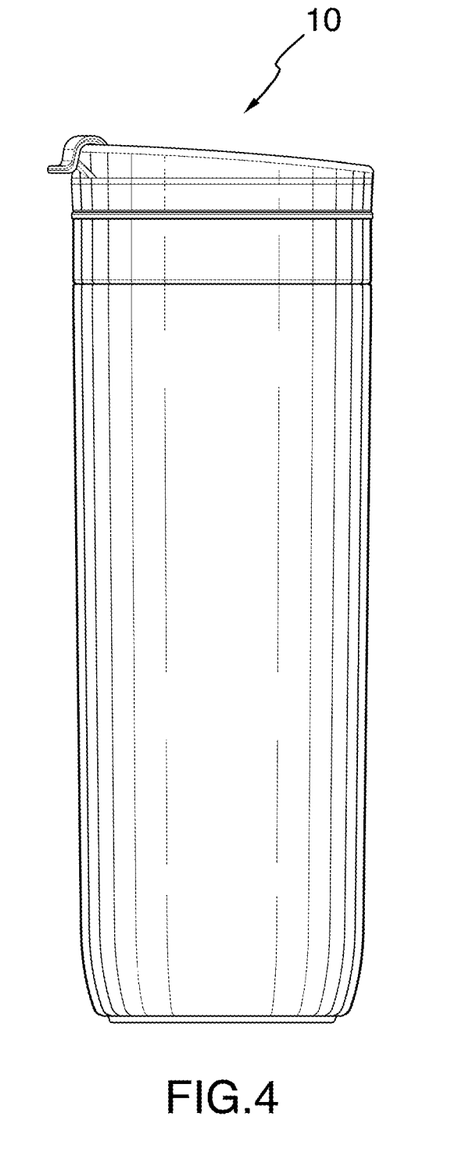
FIG. 4 is left side elevation view of an embodiment of an iced tea press.
Figure 5:
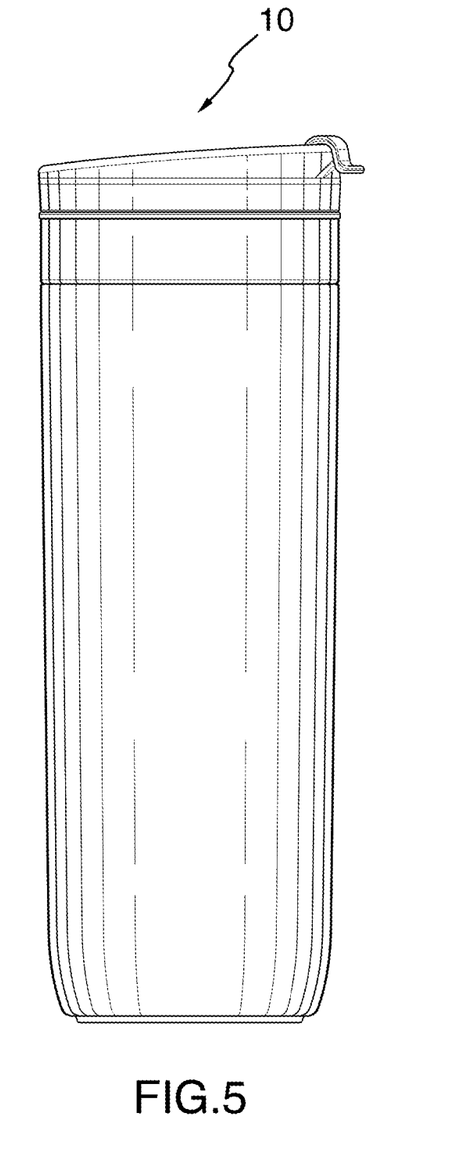
FIG. 5 is a right side elevation view of an embodiment of an iced tea press.
Figure 6:
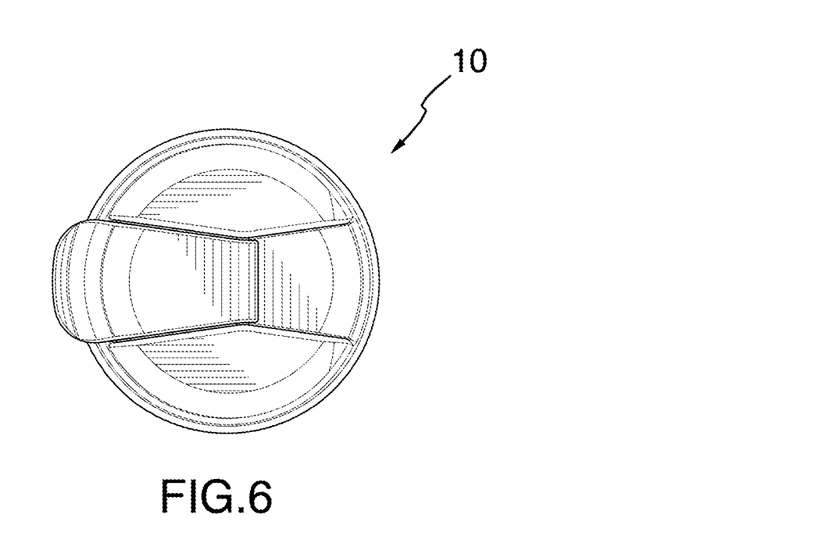
FIG. 6 is a top plan view of an embodiment of an iced tea press.
Figure 7:
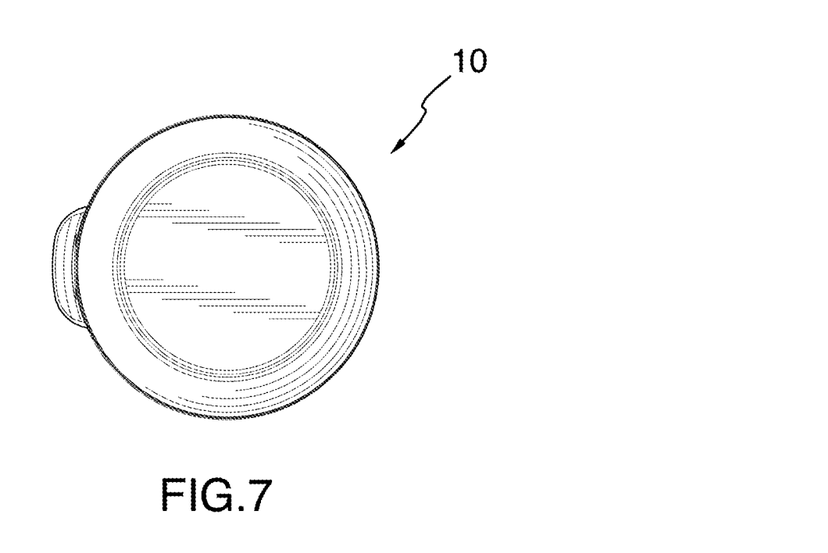
FIG. 7 is a bottom plan view of an embodiment of an iced tea press.
Figure 8:
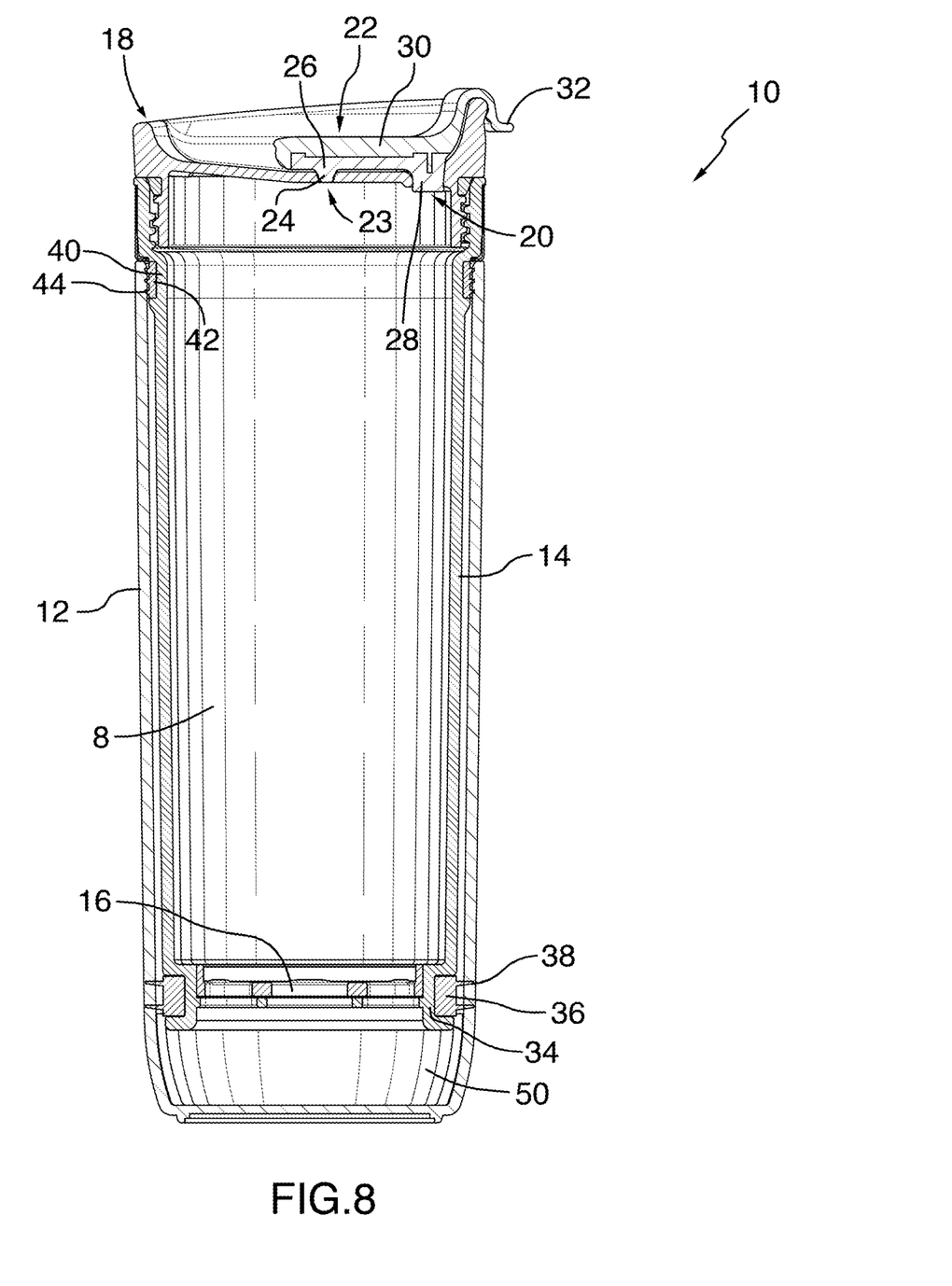
FIG. 8 is a cross-section view taken along lines A-B shown in FIG. 2 of an embodiment of an iced tea press.

In one embodiment, the openable member 18 is threadingly secured at the top end of the elongated hollow member 14. Referring to FIG. 8, there is shown an embodiment with the openable member 18 threadingly secured at the top of the elongated hollow member 14.

It will be appreciated that the openable member 18 may have various shapes and sizes.

It will be appreciated that the purpose of the openable member 18 is to selectively allow a user to drink directly from or to pour iced tea from the iced tea press 10.

In one embodiment, the openable member 18 comprises a hole 23 aligned with a center of the openable member 18 and the aperture 20.

Still in this embodiment, the corresponding closing member 22 comprises a first prong 24 extending perpendicularly and downwardly towards the hole 23.

The first prong 24 is sized and shaped to tightly snuggle the hole 23 to thereby secure the corresponding closing member 22 to the openable member 18.

The skilled addressee will appreciate that various embodiments of the closing member 22 may be provided.

In one embodiment, the corresponding closing member 22 comprises a first elongated element 26 comprising the first prong 24 and a tab 28 for covering the aperture 20.

The corresponding closing member 22 further comprises a covering element 30 secured to the first elongated element 26. The covering element 30 comprises a tab 32 extending outwardly. The tab 28 is used for enabling a user to easily open and close the closing member 22 with its fingers.

It will be appreciated that in one embodiment, the elongated hollow member 14 comprises at least one sealing element for enabling the elongated hollow member 14 to tightly fit inside the elongated hollow container 12. The purpose of the at least one sealing element is also to fluidly isolate the inside 50 of the elongated hollow container 12 from the outside.

Figure 10:
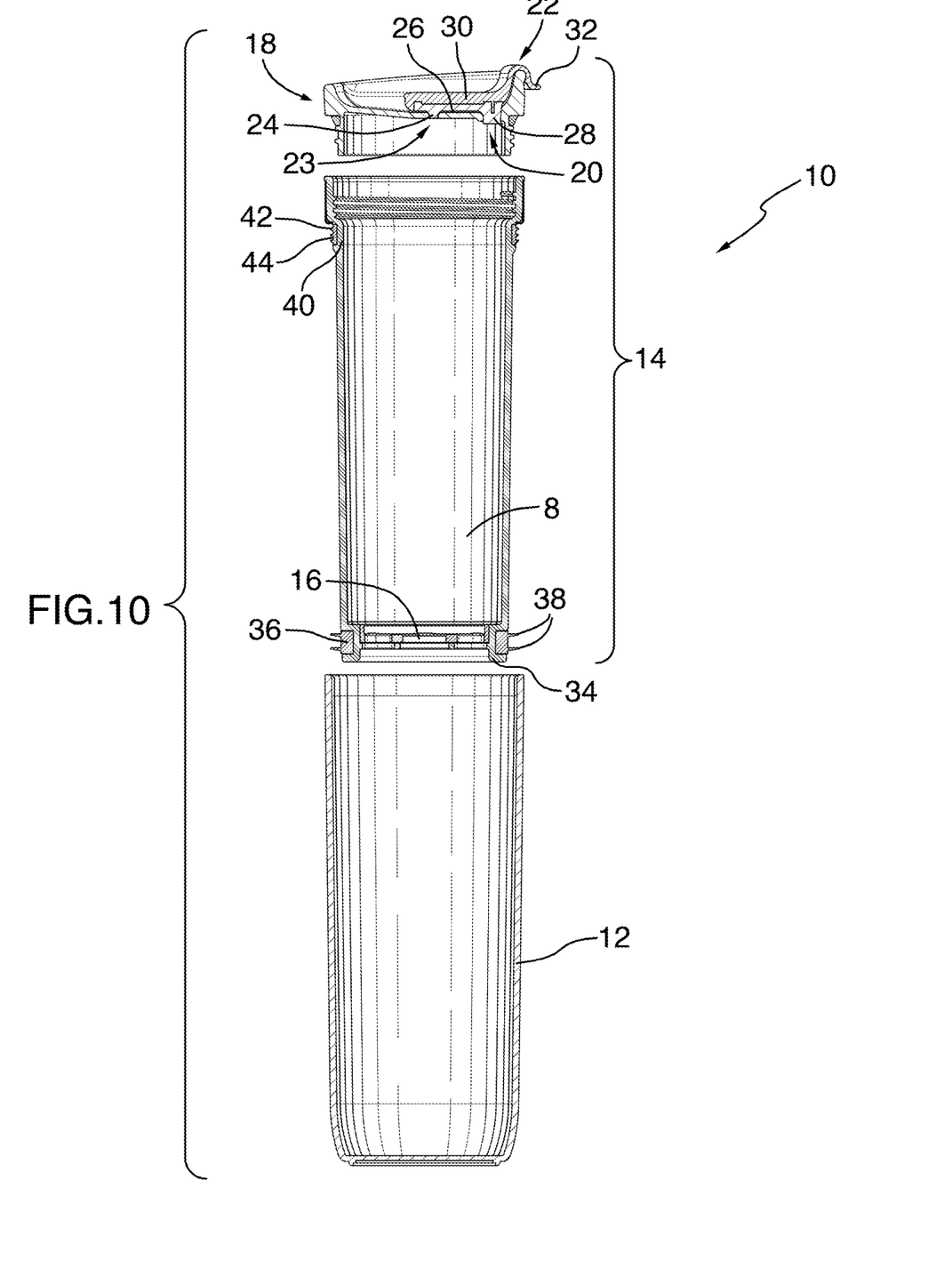
FIG. 10 is an exploded, cross-section view taken along lines A-B shown in FIG. 2 of an embodiment of an iced tea press.

Still in this embodiment and as shown in FIGS. 8 and 10, the elongated hollow member 14 comprises a bottom groove 34 extending horizontally at a bottom of the elongated hollow container 14. Still in this embodiment, the at least one sealing element comprises a corresponding bottom sealing element 36 secured in the bottom groove 34 and comprising at least one lid 38 extending outwardly.

As shown for instance in FIGS. 8 and 10, the elongated hollow member 14 further comprises a upper groove 40 extending horizontally near a top of the elongated hollow member 14. In this embodiment, the at least one sealing element comprises a corresponding upper sealing element 42 secured in the upper groove and comprising at least one lid 44 extending outwardly.

Use of the Iced Tea Press

It will be appreciated that the iced tea press 10 disclosed may be advantageously used for making iced tea.

Typically, a tea mixture is inserted into the elongated hollow container 12.

A hot liquid, typically water, is then poured inside the elongated hollow container 12. As mentioned above, the hot liquid will fill partially the elongated hollow container 12.

The tea is allowed to infuse for a given amount of time. The skilled addressee will appreciate that the given amount of time may depend on various parameters such as the nature/composition of the tea, the temperature of the water, the amount of water inserted versus the amount of tea, etc.

Concurrently, a cooling element is inserted into the elongated hollow member 14.

In one embodiment, the cooling element comprises ice cubes. In an alternative embodiment, the cooling element is selected from a group consisting of frozen fruit, fruit juice and frozen tea.

Figure 11:
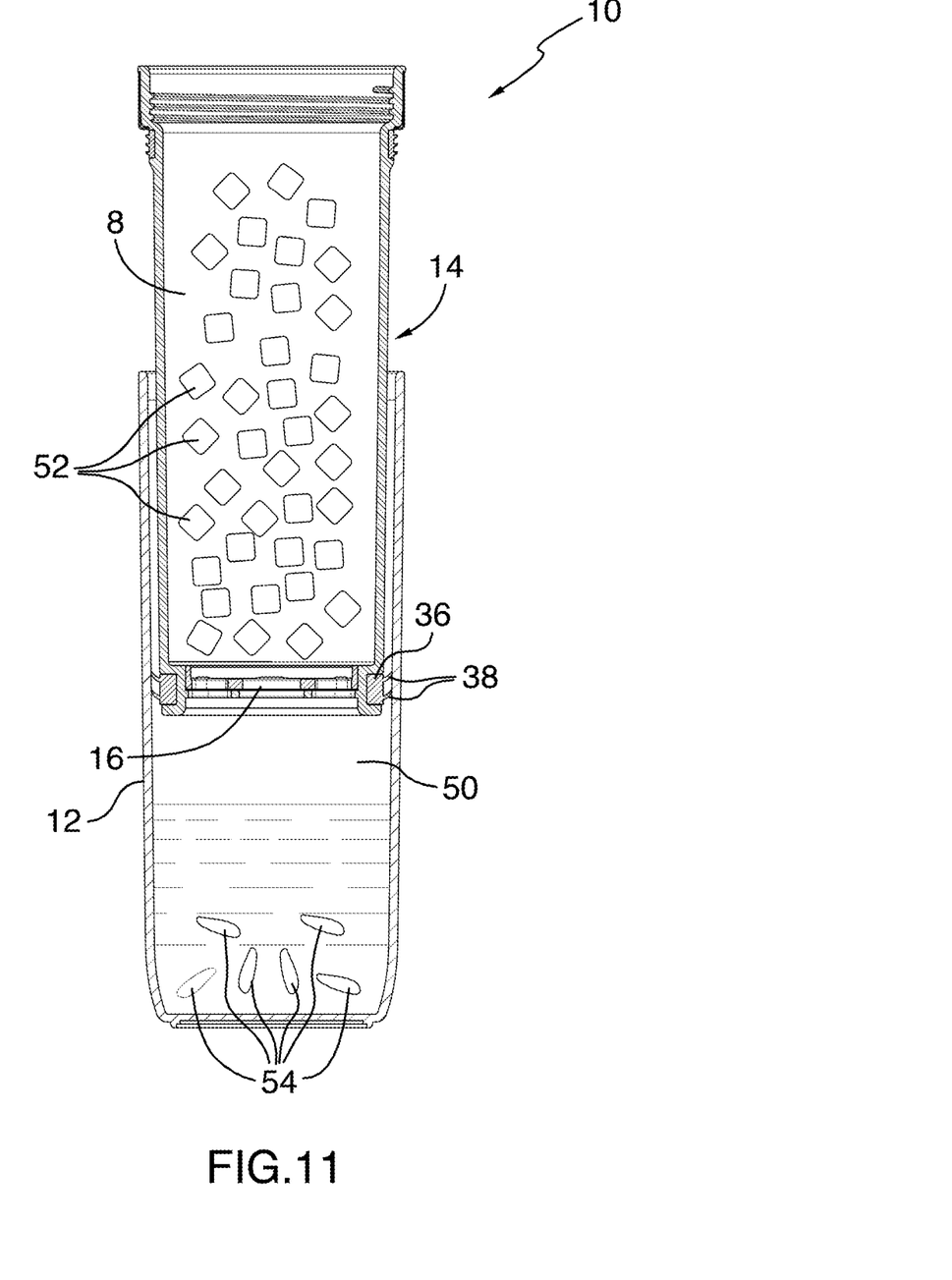
FIG. 11 is cross-section view taken along lines A-B shown in FIG. 2 of an embodiment of an iced tea press, wherein the elongated hollow member is partially inserted into the elongated hollow container.
Figure 12:
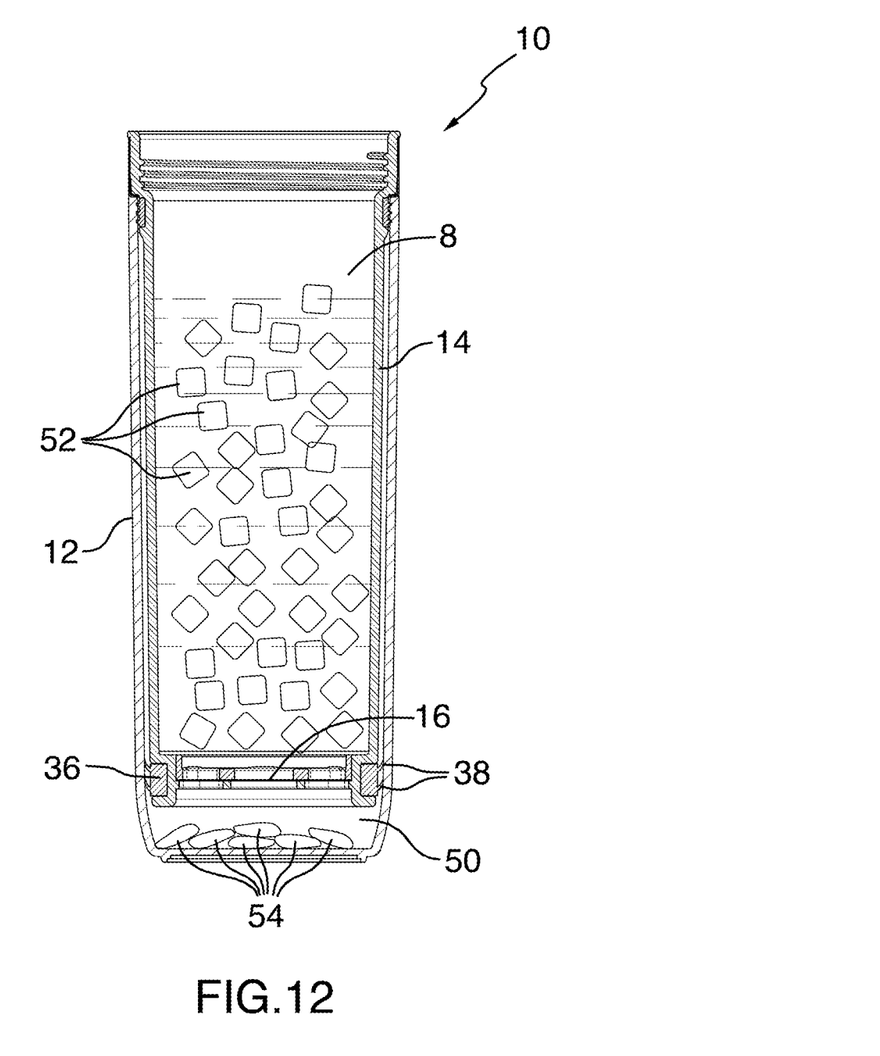
FIG. 12 is cross-section view taken along lines A-B shown in FIG. 2 of an embodiment of an iced tea press, wherein the elongated hollow member is fully inserted into the elongated hollow container.

The elongated hollow member 14 is then slidably inserted inside the elongated hollow container 12 as shown in FIGS. 11 and 12. In FIG. 12, the elongated hollow member 14 is engaged at a fully inserted position inside the elongated hollow container 12. The tea 54 is trapped inside the elongated hollow container 14 and cannot leave an inside volume 50 thanks to the at least one sealing element. It will be appreciated that alternatively the tea mixture and the hot liquid may be inserted into the elongated hollow container 12 after having inserted the elongated hollow member 14 depending on the choice of a user.

The skilled addressee will appreciate that the presence of the cooling element 52 will cool the infused tea and thereby create iced tea.

The iced tea press 10 may then be optionally shaken by the user in order for the iced tea to have a uniform temperature.

Once the iced tea is cool enough and/or uniform enough in terms of temperature, the openable top end may be open and a user may then enjoy the iced tea created. Alternatively, the iced tea may be poured into a recipient.

An advantage of the iced tea press 10 disclosed herein is that it is transportable by a user.

Another advantage of the iced tea press 10 disclosed herein is that a user may consume the iced tea readily from it thanks to the plurality of cavities sized and shaped for retaining the tea.

Another advantage of the iced tea press 10 disclosed herein is that it enables a user to insert a cooling element without spilling the liquid outside the iced tea press 10. This is achieved by the fact that the user can monitor the level of the liquid inside the elongated hollow member 14 when adjusting the insertion of the elongated hollow member 14 inside the elongated hollow container 12, which is of great advantage.

Although the above description relates to a specific preferred embodiment as presently contemplated by the inventor, it will be understood that the invention in its broad aspect includes functional equivalents of the elements described herein.

The invention claimed is:

1. An iced tea press comprising:
    an elongated hollow container;
    an elongated hollow member sized and shaped to be slidably inserted into the elongated hollow container; the elongated hollow member having a bottom end comprising a plurality of cavities sized and shaped for retaining particles of a given size and an openable top end,
    wherein
    the openable top end comprises a manually openable member at the top end of the elongated hollow member,
    the openable member comprises an aperture and a corresponding closing member for selectively opening or closing the aperture,
    wherein the openable member comprises a hole aligned with a center of the openable member and the aperture,
    further wherein the corresponding closing member comprises a first prong extending perpendicularly from the closing member and sized and shaped to tightly snuggle the hole to thereby secure the corresponding closing member to the openable member.

2. The iced tea press as claimed in claim 1, wherein the openable member is threadingly engaged at the top end of the elongated hollow member.

3. The iced tea press as claimed in claim 1, wherein the corresponding closing member comprises:
    a first elongated element comprising the first prong and a tab for covering the aperture;
    a covering element secured to the first elongated element; the covering element comprising a tab extending outwardly.

4. The iced tea press as claimed in claim 3, wherein the covering element is made of a flexible rubber selected from a group consisting of silicone and Thermoplastic Elastomer (TPE).

5. The iced tea press as claimed in claim 1, wherein the elongated hollow member comprises at least one sealing element for enabling the elongated hollow member to tightly fit in the elongated hollow container.

6. The iced tea press as claimed in claim 5, wherein the elongated hollow member comprises a bottom groove extending horizontally at a bottom of the elongated hollow member; further wherein the at least one sealing element comprises a corresponding bottom sealing element secured in the bottom groove and comprising at least one lid extending outwardly.

7. The iced tea press as claimed in claim 6, wherein the elongated hollow member comprises an upper groove extending horizontally near a top of the elongated hollow member; further wherein the at least one sealing element comprises a corresponding upper sealing element secured in the upper groove and comprising at least one lid extending outwardly.

8. The iced tea press as claimed in claim 7, wherein the elongated hollow container and the elongated hollow member are made of acrylic.

9. The iced tea press as claimed in claim 6, wherein the corresponding bottom sealing element and the corresponding upper sealing element are made of silicone.

10. The iced tea press as claimed in claim 1, wherein the elongated hollow container and the elongated hollow member have a cylindrical shape.

11. The iced tea press as claimed in claim 1, wherein each of the plurality of cavities has a diameter size measured in microns.

* * * * *